Dec. 8, 1953　　　　　G. HOOKHAM　　　　2,661,770
GOGGLE VALVE
Filed Oct. 26, 1949　　　　　　　　　　　2 Sheets-Sheet 2
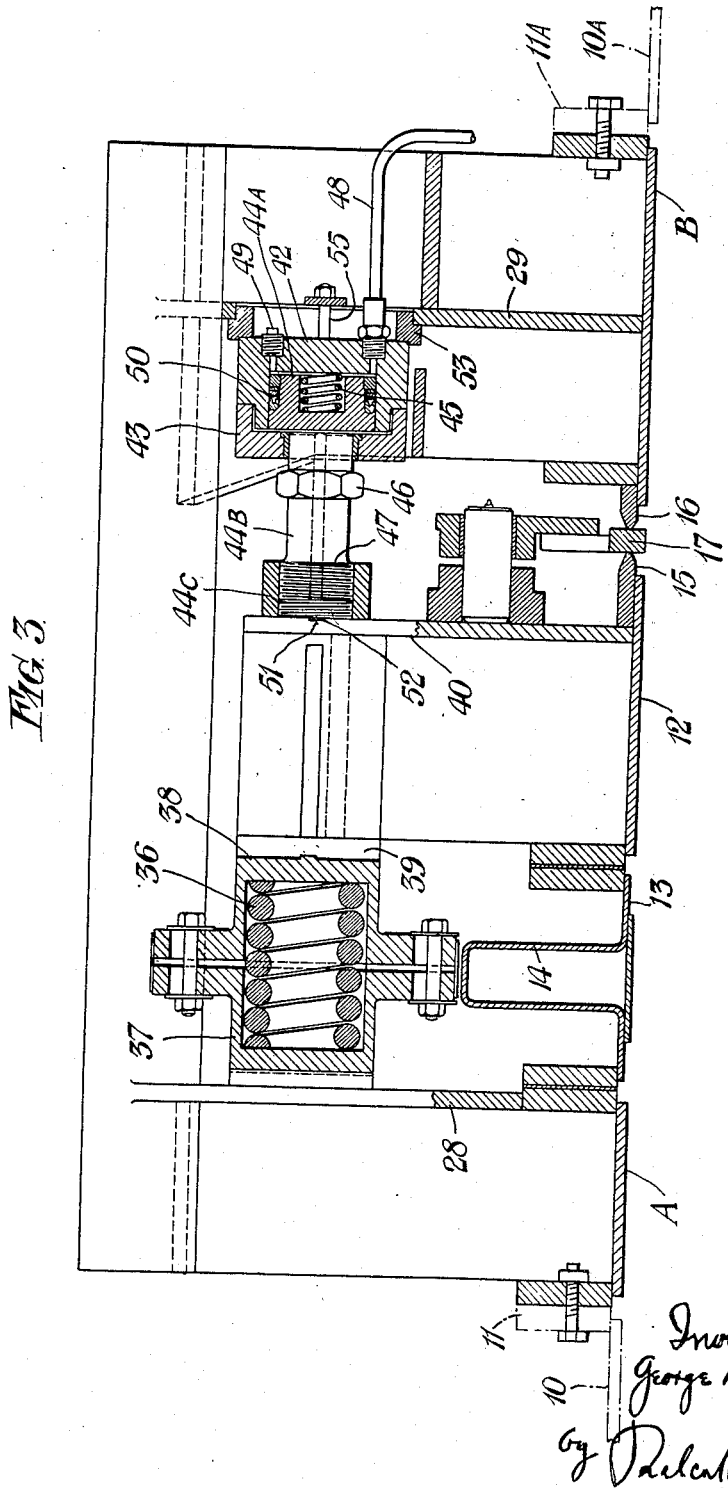
Inventor
George Hookham
by Malcolm W...
attorney Patented Dec. 8, 1953

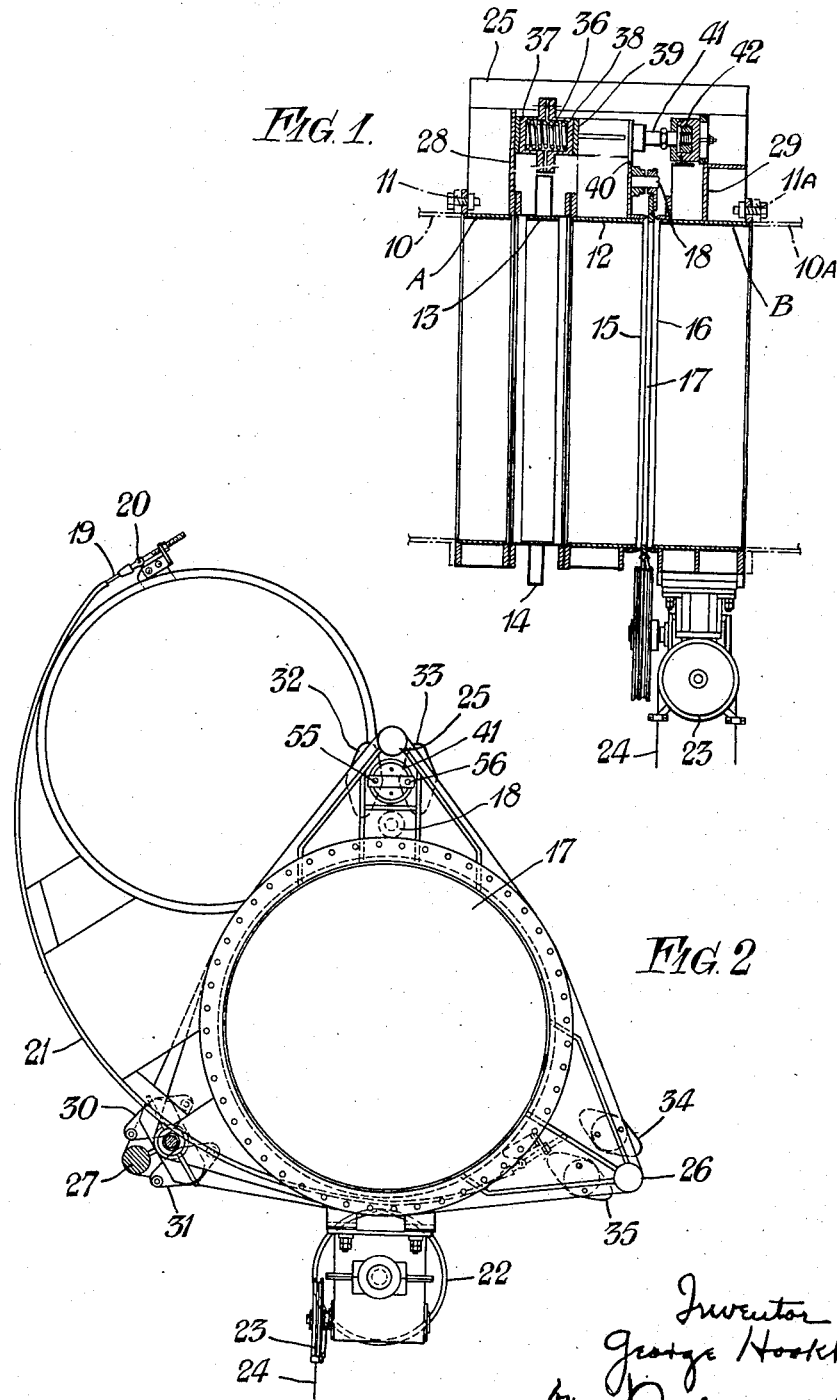

2,661,770

UNITED STATES PATENT OFFICE 2,661,770

GOGGLE VALVE

George Hookham, London, England, assignor to John Miles & Partners (London) Limited, London, England, a British company Application October 26, 1949, Serial No. 123,621

Claims priority, application Great Britain September 7, 1949

4 Claims. (Cl. 138—94)

The present invention relates to an improved plate or goggle valve of the kind commonly used for controlling the flow of fluid through pipes of relatively large diameter.

It is common practice at the present time, in order to control the flow of fluid through a pipe, to make a gap in the pipe and insert in the gap a valve which consists essentially of two short lengths of pipe sections, a movable goggle plate nipped between the pipe sections, springs for urging the pipe sections together so as to nip the plate, and hydraulic rams for moving the pipe sections apart against the action of the springs, when it is desired to adjust the setting of the goggle plate.

Such an arrangement has the advantage that the valve as a whole can be assembled in the workshop and then moved transversely into position in the gap, or can be unbolted and moved transversely within the gap, for repair, and all with little disturbance.

Nevertheless, with these known arrangements, it is not possible to remove a single spring for repair independently of the other springs and independently of the rams, so that whenever one spring has to be repaired, the whole goggle valve is placed out of commission or its functioning is at least seriously impaired. The same conditions apply if a ram has to be removed for repair.

Accordingly it is an object of the present invention to provide means whereby either a single spring or a single ram can be removed for replacement or repair without placing the goggle valve out of commission or seriously impairing its function.

A preferred form of the invention will now be described with reference to the accompanying diagrammatic drawings, in which Figure 1 is a longitudinal section through a valve, Figure 2 is an end elevation of the valve, partly in section, and Figure 3 is a longitudinal section, on a more open scale, of a portion of the valve shown in the other figures.

The pipe through which the fluid to be controlled passes is shown at 10, 10A. A gap is made in it and its ends are flanged as shown at 11, 11A to receive a similarly flanged goggle valve which can be moved into the gap transversely and bolted to the flanges 11, 11A as shown in Figure 1.

The valve comprises two short lengths of pipe section A and B between which is located a ring 12. Between the ring 12 and pipe section A is bolted an expansion joint 13 provided with a bellows 14. The ring 12 and pipe section B are formed with valve seats 15 and 16 respectively between which can be nipped a goggle plate 17. The goggle plate is rotatable on a pivot 18 mounted on the ring 12.

The goggle plate 17 is moved transversely with respect to the pipe sections by means of a cable 19 fixed at 20, passing around the frame 21 of the goggle plate and around a drum 22 which is controlled with the aid of a hand-wheel 23 and chain 24.

The pipe sections A and B are held rigidly at a fixed distance apart by means of the equiangularly spaced longitudinal rods 25, 26 and 27 and transverse plates such as those shown at 28 and 29.

The goggle plate 17 is nipped between the valve seats 15 and 16 with the aid of three pairs of similar springs equiangularly spaced around the pipe sections. The six springs are housed in three pairs of boxes 30, 31; 32, 33 and 34, 35 respectively, and one of the springs, namely, that in the box 33, is shown at 36 (Figure 3).

Each box consists of two parts 37 and 38, the former of which bears against plate 28 and the latter of which bears against a plate 39 rigid with a plate 40 fixed on the ring 12. The arrangement of springs is such that they serve normally to urge the valve seats 15 and 16 together so as to nip the goggle plate 17 therebetween.

Whenever it be desired to adjust the setting of the goggle plate the valve seats 15 and 16 are moved apart against the action of the springs with the aid of three hydraulic rams which are equiangularly spaced around the pipes. One of the rams is shown at 41 in the figures. It comprises, as shown most clearly in Figure 3, a cylinder 42 provided with a removable cover 43 and a three-part piston 44A, 44B and 44C. The part 44A is housed entirely within the cylinder and is urged by a light spring 45 against the part 44B which is formed with a nut 46 intermediate its length and is screw-threaded as at 47 so that it can be screwed into and out of the internally threaded piston-part 44C.

The cylinder 42 is provided with an inlet 48 and outlet 49, and the piston part 44A is provided with the usual annular washer 50.

The right-hand side of the plate 40 is formed with a recess 51, whilst the annular piston part 44C is formed on its left-hand end with a pair of diametral spigots, one of which is shown at 52, seated in the recess 51.

During normal operation, that is to say, when the goggle plate 17 is nipped between the valve seats 15 and 16, the springs such as 36 urge the two parts 37 and 38 of each box outwardly apart to push the valve seat 15 against valve seat 16, and in this position the parts 44B and 44C of the piston are so spaced that the part 44B bears lightly against, and holds, the part 44A in its extreme right-hand position (with reference to Figure 3) against the action of the spring 45, so that the three-part piston 44A, B and C is thus tight between the plate 40 and the base of the piston 42.

In order to release the goggle plate, oil under high pressure is injected through inlet 48 into the cylinder 42, whilst the outlet 49 is blocked. In this way the piston moves to the left with reference to Figure 3 and forces the plate 40 and ring 12 to the left so as to release the valve seats 15 and 16. Meanwhile, the two-part boxes such as 37, 38 are closed up against the action of the springs such as 36 which they contain.

The reason for making each piston in three separate parts is to enable it to be removed from the goggle valve for repair or replacement by a transverse movement with respect to the pipes. Parts 44B and 44C are, essentially, a telescoping rod and sleeve assembly whose total length can be varied by operation of their cooperating threads 47. This is done by screwing the part 44B, with the aid of nut 46, into the part 44C. The light spring 45 pushes the piston part 44A to the left until it is stopped against the inside of the cylinder cover 43. Further screwing of the nut 46 is effective to withdraw the key spigot 52 from the keyway recess 51 and shorten the combined length of the parts 44B and 44C until these two parts can be removed in a transverse direction from the valve.

Preferably, and as shown, the cylinder 42 is seated in an internally recessed annulus 53 which is also externally recessed to seat in a circular aperture formed in a plate 29 rigid with the pipe section B.

In order to remove the cylinder for replacement or repair, the inlet and outlet pipes 48 and 49 are disconnected, the two bolts 55 and 56 (see also Figure 2) are unscrewed, the cylinder 42 is moved to the left until the ring 53 can be moved transversely away from the valve, and then the cylinder 42 is moved to the right through the circular aperture in the plate 54, taking with it the piston part 44A and the cover 43.

I claim:
1. A goggle valve for controlling the flow of fluid through two coaxially spaced pipe sections, comprising means for holding adjacent ends of the pipe sections at a fixed axial distance apart, an axially movable ring located between the fixed ends of the pipe sections, an expansion joint movably connecting said ring to one pipe section, a transversely movable goggle plate removably engageable between the ring and the other pipe section, springs between the ring and one pipe section to urge the ring towards the other pipe section and thereby tightly knitting said goggle plate between said ring and other pipe section, and rams engaged between the ring and the other pipe section for moving the ring away from the said other pipe section against the action of the springs.

2. A goggle valve as claimed in claim 1, wherein each ram is removable, transversely of the pipe sections, independently of the springs and all other rams.

3. A goggle valve as claimed in claim 2, wherein each ram comprises a multi-part, contractible piston.

4. A goggle valve as claimed in claim 1, wherein each ram comprises a cylinder bearing against an annulus seated in an aperture formed in a flange on one of the pipes, said cylinder being of greater diameter than the diameter of said ring, but being of less diameter than the diameter of said aperture so that when the ring has been moved transversely away from the ram, the cylinder can be removed in an axial direction through the aperture in the flange.

GEORGE HOOKHAM.

References Cited in the file of this patent
UNITED STATES PATENTS

| Number | Name | Date |
| --- | --- | --- |
| 1,947,453 | Bailey | Feb. 20, 1934 |
| 1,998,080 | Gerlich | Apr. 16, 1935 |
| 1,998,081 | Gerlich | Apr. 16, 1935 |

FOREIGN PATENTS

| Number | Country | Date |
| --- | --- | --- |
| 324,654 | Germany | Nov. 20, 1918 |
| 349,813 | Great Britain | June 4, 1931 |